United States Patent
Hosomizu et al.

(10) Patent No.: US 10,818,410 B2
(45) Date of Patent: Oct. 27, 2020

(54) RESIN COMPOSITION, INORGANIC FILLER, DIRECT-CURRENT POWER CABLE, AND METHOD OF MANUFACTURING DIRECT-CURRENT POWER CABLE

(71) Applicant: SUMITOMO ELECTRIC INDUSTRIES, LTD., Osaka-shi, Osaka (JP)

(72) Inventors: Kohei Hosomizu, Osaka (JP); Yoitsu Sekiguchi, Osaka (JP); Takanori Yamazaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/789,647

(22) Filed: Feb. 13, 2020

(65) Prior Publication Data
US 2020/0279672 A1 Sep. 3, 2020

(30) Foreign Application Priority Data
Feb. 25, 2019 (JP) .................. 2019-031854

(51) Int. Cl.
*H01B 9/00* (2006.01)
*H01B 3/44* (2006.01)
(Continued)

(52) U.S. Cl.
CPC .............. *H01B 3/441* (2013.01); *C08G 77/26* (2013.01); *C08G 77/62* (2013.01); *C08K 3/013* (2018.01); *C08K 3/22* (2013.01); *C08K 9/06* (2013.01); *C08L 23/06* (2013.01); *C08L 23/08* (2013.01); *C08L 23/12* (2013.01); *C08L 23/14* (2013.01); *C08L 23/16* (2013.01); *C08K 2003/222* (2013.01); *C08K 2201/003* (2013.01);
(Continued)

(58) Field of Classification Search
CPC . H01B 3/441; H01B 9/00; H01B 7/02; H01B 7/04; H01B 7/06; H01B 7/08
USPC .............. 174/110 R–110 PM, 120 R–120 SR
See application file for complete search history.

(56) References Cited

U.S. PATENT DOCUMENTS 4,609,959 A * 9/1986 Rudi .................... G11B 5/5504
  360/261.3
6,716,920 B2 * 4/2004 Arhart ...................... C08F 8/42
  525/102
(Continued)

FOREIGN PATENT DOCUMENTS

JP S58-185405 A 10/1983
JP H04-368719 A 12/1992
(Continued)

OTHER PUBLICATIONS

Shin-Etsu Chemical Co., Ltd. Silane coupling agent Dec. 2017, and https://www.silicone.jp/catalog/pdf/SilaneCouplingAgents_J.pdf.
(Continued)

*Primary Examiner* — William H. Mayo, III
(74) *Attorney, Agent, or Firm* — Oliff PLC

(57) ABSTRACT

A resin composition forming an insulation layer, including a base resin containing polyolefin, and an inorganic filler; wherein a surface of the inorganic filler includes a hydrophobic silyl group represented by formula (1) and an aminosilyl group having an amino group.

20 Claims, 3 Drawing Sheets

(51) Int. Cl.

| | | |
|---|---|---|
| C08L 23/08 | (2006.01) | |
| C08L 23/12 | (2006.01) | |
| C08L 23/14 | (2006.01) | |
| C08L 23/16 | (2006.01) | |
| C08K 3/013 | (2018.01) | |
| C08K 3/22 | (2006.01) | |
| C08K 9/06 | (2006.01) | |
| C08G 77/62 | (2006.01) | |
| C08G 77/26 | (2006.01) | |
| C08L 23/06 | (2006.01) | |

(52) U.S. Cl.
CPC ....... *C08L 2201/00* (2013.01); *C08L 2203/16* (2013.01); *C08L 2203/202* (2013.01); *C08L 2207/066* (2013.01)

(56) References Cited

U.S. PATENT DOCUMENTS

| | | | | |
|---|---|---|---|---|
| 7,579,397 | B2* | 8/2009 | Nelson | B82Y 30/00 |
| | | | | 174/110 AR |
| 7,884,149 | B2* | 2/2011 | Nelson | B82Y 30/00 |
| | | | | 524/431 |
| 9,105,374 | B2* | 8/2015 | Jungqvist | C08L 23/0869 |
| 9,127,110 | B2* | 9/2015 | Sugita | C08F 255/02 |
| 2010/0036035 | A1 | 2/2010 | Nelson et al. | |

FOREIGN PATENT DOCUMENTS

| | | |
|---|---|---|
| JP | H05-314818 A | 11/1993 |
| JP | H06-256567 A | 9/1994 |
| JP | H08-262788 A | 10/1996 |
| JP | H11-16421 A | 1/1999 |
| JP | 2007-171564 A | 7/2007 |
| JP | 2007-171709 A | 7/2007 |
| JP | 2007-187876 A | 7/2007 |
| JP | 2009-63926 A | 3/2009 |
| JP | 2010-121056 A | 6/2010 |
| JP | 2016-20942 A | 2/2016 |
| JP | 2017-179346 A | 10/2017 |
| KR | 10-2018-0062169 A | 6/2018 |
| WO | 2016/101988 A1 | 6/2016 |

OTHER PUBLICATIONS

Shin-Etsu Chemical Co., Ltd.; "Combination of Organic and Inorganic Materials," Silane Coupling Agents; Jun. 2017; pp. 1-28.

\* cited by examiner

RESIN COMPOSITION, INORGANIC FILLER, DIRECT-CURRENT POWER CABLE, AND METHOD OF MANUFACTURING DIRECT-CURRENT POWER CABLE

BACKGROUND

Technical Field

The present disclosure relates to a resin composition, an inorganic filler, a direct-current power cable (DC power cable), and a method of manufacturing the DC power cable.

The present application claims priority based on Japanese Unexamined Patent Publication No. 2019-31854 filed on Feb. 25, 2019, which is incorporated herein by reference in its entirety.

Description of Related Art

In recent years, solid-insulated direct-current power cables (hereinafter abbreviated as "DC power cables") have been developed for DC power transmission applications. Upon electric charging of a DC power cable, space charges are generated in the insulation layer, which may cause a leakage current. Therefore, an inorganic filler may be sometimes added to the resin composition forming the insulation layer in order to suppress the leakage current during electric charging (for example, Patent Document 1).
Patent Document 1: Japanese Unexamined Patent Publication No. 1999-16421

SUMMARY OF THE INVENTION

According to an aspect of the present disclosure,
there is provided a resin composition forming an insulation layer, including:
a base resin containing polyolefin, and
an inorganic filler;
wherein a surface of the inorganic filler includes:
a hydrophobic silyl group represented by the following formula (1), and
an aminosilyl group having an amino group:

[Chem. 1]

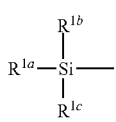

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

According to another aspect of the present disclosure,
there is provided an inorganic filler compounded into a resin composition forming an insulation layer and added to a base resin containing polyolefin,
wherein a surface of the inorganic filler includes:
a hydrophobic silyl group represented by the following formula (1), and
an aminosilyl group having an amino group:

[Chem. 2]

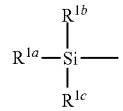

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

According to yet another aspect of the present disclosure,
there is provided a direct-current power cable including:
a conductor, and
an insulation layer provided to cover an outer periphery of the conductor;
the insulation layer containing a resin composition including:
a base resin containing polyolefin, and
an inorganic filler;
wherein a surface of the inorganic filler includes:
a hydrophobic silyl group represented by the following formula (1), and
an aminosilyl group having an amino group:

[Chem. 3]

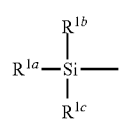

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

According to yet another aspect of the present disclosure,
there is provided a method of manufacturing a direct-current power cable including:
preparing a resin composition including a base resin containing polyolefin, and an inorganic filler; and
forming an insulation layer with the resin composition to cover an outer periphery of a conductor,
the preparation of the resin composition including: surface-treating the inorganic filler with a predetermined hydrophobic silane coupling agent and a predetermined aminosilane coupling agent;
wherein, in the surface-treatment of the inorganic filler,
a hydrophobic silyl group derived from the hydrophobic silane coupling agent and represented by the following formula (1), and an aminosilyl group derived from the aminosilane coupling agent and having an amino group are bonded to a surface of the inorganic filler:

[Chem. 4]

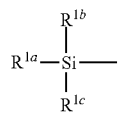

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

DESCRIPTION OF THE EMBODIMENTS

Figure 1:
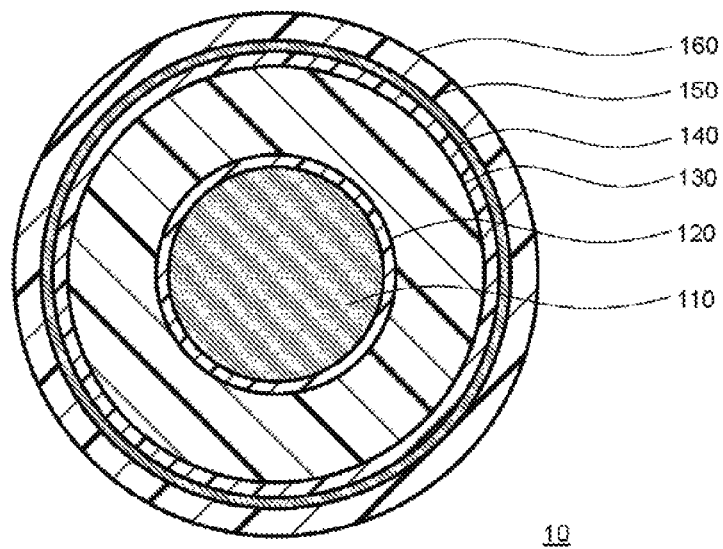
FIG. 1 is a schematic sectional view perpendicular to an axial direction of a DC power cable according to an embodiment of the present disclosure.

Problem to be Solved by the Disclosure

An object of the present disclosure is to provide a technique that can improve an insulation property of an insulation layer.

Advantageous Effect of the Disclosure

According to the present disclosure, the insulation property of the insulation layer can be improved.

Description of the Embodiment of the Disclosure

<Knowledges Obtained by the Inventors>

First, an outline of the knowledges obtained by the inventors will be described.

In the DC power cable described above, the inorganic filler added in the insulation layer may be surface-treated with the silane coupling agent. Thereby, the compatibility of the inorganic filler with the base resin can be improved.

The present inventors evaluated the insulation property of the insulation layer while changing the substituent in the silane coupling agent used for the surface-treatment of the inorganic filler. As a result, the present inventors found that the insulation property of the insulation layer depends on the substituent of the silane coupling agent used for the surface-treatment of the inorganic filler.

The present disclosure is based on the above-described knowledges found by the inventors.

Embodiments of the Disclosure

Next, embodiments of the present disclosure will be listed and described.

[1] A resin composition according to an aspect of the present disclosure is:

a resin composition forming an insulation layer, including:

a base resin containing polyolefin, and
an inorganic filler;
wherein a surface of the inorganic filler includes:
a hydrophobic silyl group represented by the following formula (1), and
an aminosilyl group having an amino group

[Chem. 5]

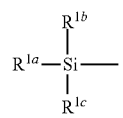

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

According to this configuration, the insulation property of the insulation layer can be stably improved.

[2] In the resin composition according to [1], a molar fraction of the aminosilyl groups with respect to all of the silyl groups bonded to the surface of the inorganic filler is 2% or more and 90% or less.

According to this configuration, the effect of improving the insulation property of the insulation layer by giving the aminosilyl group to the inorganic filler can be stably obtained.

[3] In the resin composition according to [1], a mass ratio of nitrogen to carbon is 0.7% or more and 35% or less, as obtained by elemental analysis of the surface of the inorganic filler by gas chromatography using a thermal conductivity detector under condition at a reaction temperature of 850° C. and a reduction temperature of 600° C.

According to this configuration, the effect of improving the insulation property of the insulation layer by giving the aminosilyl group to the inorganic filler can be stably obtained.

[4] In the resin composition according to any one of [1] to [3], the aminosilyl group includes a hydrocarbon group having the amino group; and the carbon number of each of $R^{1a}$, $R^{1b}$, and $R^{1c}$ included in the hydrophobic silyl group is smaller than the carbon number of the hydrocarbon group having the amino group in the aminosilyl group.

The term "carbon number" used herein refers to the number of carbon atoms.

According to this configuration, the electrostatic repulsion effect between amino groups can be efficiently caused.

[5] In the resin composition according to [4], the carbon number of the hydrocarbon group having the amino group in the aminosilyl group is 3 or more and 12 or less.

According to this configuration, the electrostatic repulsion effect between amino groups can be efficiently caused.

[6] In the resin composition according to any one of [1] to [5], the hydrophobic silyl group is bonded to a part of the surface of the inorganic filler, while the aminosilyl group is bonded to another part of the surface.

According to this configuration, the insulation property of the insulation layer can be stably improved.

[7] In the resin composition according to any one of [1] to [6], the content of the inorganic filler is 0.1 parts by mass or more and 10 parts by mass or less with respect to 100 parts by mass of the base resin.

According to this configuration, by setting the content of the inorganic filler to 0.1 parts by mass or more, a space charge can be sufficiently trapped by the inorganic filler. On the other hand, by setting the content of the inorganic filler to 10 parts by mass or less, the dispersibility of the inorganic filler in the insulation composition can be improved while improving the moldability of the resin composition.

[8] In the resin composition according to any one of [1] to [7], the base resin contains low density polyethylene, and a volume resistivity of a sheet of a resin composition is $8 \times 10^{15}$ $\Omega \cdot cm$ or more, as measured under the condition at the temperature of 80° C. and the direct-current field of 50 kV/mm, when the sheet of the resin composition including the base resin and the inorganic filler and having a thickness of 0.2 mm is formed.

According to this configuration, a DC power cable with improved insulation property of the insulation layer can be obtained.

[9] In the resin composition according to any one of [1] to [7], the base resin contains the thermoplastic olefinic elastomer including the ethylene propylene rubber or the ethylene propylene diene rubber dispersed in or copolymerized with polyethylene or polypropylene, and a volume resistivity of a sheet of a resin composition is $5 \times 10^{15}$ $\Omega \cdot cm$ or more, as measured under the condition at the temperature of 80° C. and the direct-current field of 50 kV/mm, when the sheet of the resin composition including the base resin and the inorganic filler and having a thickness of 0.2 mm is formed.

According to this configuration, a DC power cable with improved insulation property of the insulation layer can be obtained.

[10] The inorganic filler according to another aspect of the present disclosure is an inorganic filler compounded into a resin composition forming an insulation layer and added to a base resin containing polyolefin, wherein a surface of the inorganic filler includes:
a hydrophobic silyl group represented by the following formula (1), and
an aminosilyl group having an amino group:

[Chem. 6]

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

According to this configuration, the insulation property of the insulation layer can be stably improved.

[11] A direct-current power cable according to yet another aspect of the present disclosure includes:
a conductor, and
an insulation layer provided to cover an outer periphery of the conductor;
the insulation layer containing a resin composition including:
a base resin containing polyolefin, and
an inorganic filler;
wherein a surface of the inorganic filler includes:
a hydrophobic silyl group represented by the following formula (1), and
an aminosilyl group having an amino group:

[Chem. 7]

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

According to this configuration, the insulation property of the insulation layer can be stably improved.

[12] A method of manufacturing the direct-current power cable according to yet another aspect of the present disclosure includes:

preparing a resin composition including a base resin containing polyolefin, and an inorganic filler; and forming an insulation layer with the resin composition to cover an outer periphery of a conductor, the preparation of the resin composition including: surface-treating the inorganic filler with a predetermined hydrophobic silane coupling agent and a predetermined aminosilane coupling agent;

wherein, in the surface-treatment of the inorganic filler, a hydrophobic silyl group derived from the hydrophobic silane coupling agent and represented by the following formula (1), and an aminosilyl group derived from the aminosilane coupling agent and having an amino group are bonded to a surface of the inorganic filler:

[Chem. 8]

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

According to this configuration, the insulation property of the insulation layer can be stably improved.

Details of Embodiment of the Disclosure

Next, an embodiment of the present disclosure will be described below with reference to the drawings. The present invention is not limited to these illustrations, but intended to be indicated by claims and encompass all the changes which fall within the meaning and scope equivalent to claims. The term "$C_p$ to $C_n$" used herein refers to contain from p to n carbon atoms.

One Embodiment of the Disclosure (1) Resin Composition

The resin composition of this embodiment is a material forming an insulation layer 130 of a DC power cable 10 described later, and includes, for example, a base resin, an inorganic filler, and other additives.
(Base Resin)
A base resin (base polymer) means a resin component constituting the main component of the resin composition. The base resin of this embodiment contains, for example, polyolefin. Examples of the polyolefin constituting the base resin include, for example, polyethylene, polypropylene, ethylene-α-olefin copolymer, thermoplastic olefinic elastomer (TPO) including ethylene propylene rubber (EPR) or ethylene propylene diene rubber (EPDM) dispersed in or copolymerized with polyethylene or polypropylene, and the like. Two or more of them may be used in combination.

Examples of the polyethylene constituting the base resin include low density polyethylene (LDPE), medium density polyethylene (MDPE), and high density polyethylene (HDPE), and the like. In addition, the polyethylene may be either linear or branched, for example.
(Inorganic Filler)
The inorganic filler is an inorganic powder added to the insulation layer 130, and acts to trap the space charge in the insulation layer 130 and to suppress the local accumulation of the space charge in the insulation layer 130. Thereby, the insulation property of the insulation layer 130 can be improved.

The inorganic filler includes, for example, at least any one of magnesium oxide, silicon dioxide, zinc oxide, aluminum oxide, titanium oxide, zirconium oxide, carbon black, and a mixture of two or more of them.

Examples of a method of forming magnesium oxide as the inorganic filler include a vapor phase method in which Mg vapor and oxygen are brought into contact with each other, or a seawater method in which magnesium oxide is formed from seawater as a raw material. The method of forming the inorganic filler in this embodiment may be either a vapor phase method or a seawater method.

Examples of silicon dioxide as the inorganic filler include at least any one of fumed silica, colloidal silica, precipitated silica, and vaporized metal combustion (VMC) silica. Among them, fumed silica is preferable as silicon dioxide.

At least a part of the inorganic filler is surface-treated with a silane coupling agent. Thereby, the compatibility of the inorganic filler with the base resin can be improved as mentioned above, and the adhesion at the interface between the inorganic filler and the base resin can be improved.

In this embodiment, the inorganic filler is surface-treated with a hydrophobic silane coupling agent having a hydrophobic group, for example.

Examples of the hydrophobic silane coupling agent include at least any one of silazane, alkoxysilane or halogenated silane, which includes a hydrophobic group.

Silazane (disilazane) having a hydrophobic group is represented by the following formula (2), for example.

$$R^1_3Si-NH-SiR^1_3 \qquad (2)$$

(wherein $R^1$ represents at least any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group. The phrase "optionally substituted with an alkyl group" means that a part of hydrogen atoms in the above-described aryl group may be substituted with the alkyl group. A plurality of $R^1$s may be the same, or two or more of them may be different).

Specifically, examples of silazane having a hydrophobic group include, for example, at least any one of hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like.

In a surface-treatment step of the inorganic filler, silazane as the hydrophobic silane coupling agent reacts with a hydroxyl group on the surface of the inorganic filler. When silazane reacts, NH group in silazane forms ammonia which is released to the outside. As a result, a predetermined silyl group is formed which is strongly covalently bonded to the surface of the inorganic filler.

Alkoxysilane or halogenated silane having a hydrophobic group is represented by the following formula (3), for example.

$$R^1_3SiY \qquad (3)$$

(wherein $R^1$ represents at least any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group. Y represents a monovalent hydrolyzable group. Three $R^1$s may be the same, or two or more of them may be different).

The monovalent hydrolyzable group as Y is a $C_1$ to $C_3$ alkoxy group or a halogen group, for example.

Specifically, examples of the alkoxysilane having a hydrophobic group include, for example, trimethylmethoxysilane, trimethylethoxysilane, and the like.

In addition, examples of the halogenated silane having a hydrophobic group include, for example, trimethylchlorosilane, triethylchlorosilane, and the like.

In a surface-treatment step of the inorganic filler, the hydrolyzable group of alkoxysilane or halogenated silane as the silane coupling agent is hydrolyzed to produce a silanol group. The silanol group forms a hydrogen bond with a hydroxyl group on the surface of the inorganic filler, which further results in a dehydration condensation reaction. As a result, a predetermined silyl group is formed by a strong covalent bond to the surface of the inorganic filler.

In this embodiment, since the inorganic filler is surface-treated with the above-described hydrophobic silane coupling agent, at least a part of the surface of the inorganic filler includes, for example, a hydrophobic silyl group having a hydrophobic group derived from the hydrophobic silane coupling agent (originating from the hydrophobic silane coupling agent). In other words, the hydrophobic silyl group is bonded to at least a part of the surface of the inorganic filler. Thereby, the insulation property of the insulation layer 130 can be stably improved.

In the hydrophobic silyl group of this embodiment, three hydrophobic groups are bonded to a silicon atom. In other words, neither a hydroxyl group nor a hydrolyzable group is bonded to the silicon atom of the hydrophobic silyl group.

Specifically, the hydrophobic silyl group is represented by the following formula (1), for example.

[Chem. 9]

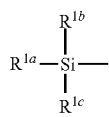

(1)

(wherein $R^{1a}$, $R^{1b}$, and $R^{1C}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different).

In the hydrophobic silyl group represented by formula (1), a bond other than the bond including $R^{1a}$, $R^{1b}$, or $R^{1c}$ is bonded to the inorganic filler with an oxygen atom interposed therebetween.

Since at least a part of the surface of the inorganic filler includes the hydrophobic silyl group represented by formula (1), the hydrophobicity on the surface of the inorganic filler can be improved. By improving the hydrophobicity on the surface of the inorganic filler, the compatibility of the inorganic filler with the base resin can be improved. Thereby, the dispersibility of the inorganic filler in the resin composition can be improved. As a result, the insulation property of the insulation layer 130 can be stably improved.

In this embodiment, each of $R^{1a}$, $R^{1b}$, and $R^{1c}$ in formula (1) is preferably, for example, a $C_1$ to $C_6$ alkyl, a $C_2$ to $C_6$ alkenyl group, or a phenyl group. Thereby, the excessive influence of a steric hindrance by $R^{1a}$, $R^{1b}$, and $R^{1c}$ can be the suppressed. As a result, the decrease in the amount of modification with the hydrophobic silane coupling agent or the like can be suppressed.

Furthermore, in this embodiment, the inorganic filler may be surface-treated not only with the hydrophobic silane coupling agent described above but also with an aminosilane coupling agent having an amino group, for example.

The aminosilane coupling agent is represented, for example, by the following formula (4).

$$R^2{}_n SiX_{4-n} \qquad (4)$$

(wherein $R^2$ represents a monovalent hydrocarbon group including at least any one of a primary amino group, a secondary amino group, a tertiary amino group, an acid-neutralized amino group (an amino group neutralized with an acid), and a quaternary ammonium base; X represents a monovalent hydrolyzable group; and n represents an integer from 1 to 3; provided that a plurality of $R^2$s may be the same or different when n is 2 or more).

Examples of the monovalent hydrolyzable group as X include, for example, a $C_1$ to $C_3$ alkoxy group and a halogen group.

Specifically, examples of the aminosilane coupling agent include, for example, at least any one of 3-aminopropyltrimethoxysilane, 3-aminopropyltriethoxysilane, N-(2-aminoethyl)-3-aminopropylmethyldimethoxysilane, N-(2-aminoethyl)-3-aminopropyltrimethoxysi lane, N-(2-aminoethyl)-3-aminopropyltriethoxysilane, 3-triethoxysilyl-N-(1,3-dimethylbutylidene)propylamine, N-phenyl-3-aminopropyltrimethoxysi lane, N-methyl-3-aminopropyltrimethoxysilane, N-ethyl-3-aminopropyltrimethoxysilane, N-butyl-3-aminopropyltrimethoxysilane, N,N-dimethyl-3-aminopropyltrimethoxysilane, N,N-diethyl-3-aminopropyltrimethoxysilane, N,N-dibutyl-3-aminopropyltrimethoxysilane, N-(vinylbenzyl)-3-aminopropyltrimethoxysilane hydrochloride, octadecyldimethyl(3-trimethoxysilylpropyl)ammonium chloride, tetradecyldimethyl(3-trimethoxysilylpropyl)ammonium chloride, N-trimethoxysilylpropyl-N,N,N-tri-n-butylammonium bromide, N-trimethoxysilylpropyl-N,N,N-tri-n-butylammonium chloride, N-trimethoxysilylpropyl-N,N,N-trimethylammonium chloride, and the like.

In this embodiment, since the inorganic filler is surface-treated not only with the above-described hydrophobic silane coupling agent but also with the aminosilane coupling agent, a part of the surface of the inorganic filler other than the part to which the hydrophobic silyl group is bonded (hereinafter, also referred to as another part of the surface of the inorganic filler) includes, for example, an aminosilyl group having an amino group derived from the aminosilane coupling agent (originating from the aminosilane coupling agent). In other words, the aminosilyl group is bonded to another part of the surface of the inorganic filler. Thereby, the insulation property of the insulation layer 130 can be further improved.

Although the details of the mechanism by which the insulation property of the insulation layer 130 is improved when another part of the surface of the inorganic filler includes an aminosilyl group are not clearly known, the following mechanism is conceivable, for example. Since another part of the surface of the inorganic filler includes an aminosilyl group, electrostatic repulsion between the amino groups on the surfaces of the inorganic fillers can be caused and the dispersibility of the inorganic filler in the resin composition can be improved when the inorganic fillers are adjacent to each other. As a result, it is considered that the insulation property of the insulation layer 130 can be stably improved.

On the other hand, when there are excessively many aminosilyl groups bonded to the surface of the inorganic filler, the electrostatic repulsion effect between the amino groups may be less likely to be obtained, due to the hydrogen bonds as described later.

In contrast, in this embodiment, since the inorganic filler is surface-treated with both the above-described hydrophobic silane coupling agent and the aninosilane coupling agent, the aminosilyl group can be suppressed from being exclusively and excessively bonded to the surface of the inorganic filler. In other words, the electrostatic repulsion effect between the aminosilyl groups can be sufficiently obtained while the effect of improving the hydrophobicity by the hydrophobic silyl group is obtained. As a result, the insulation property of the insulation layer 130 can be significantly improved.

The aminosilyl group having the amino group derived from the aminosilane coupling agent is represented by the following formula (5), for example.

[Chem. 10]

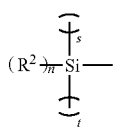

(5)

(wherein, as described above, $R^2$ represents a monovalent hydrocarbon group including at least any one of a primary amino group, a secondary amino group, a tertiary amino group, an acid-neutralized amino group, and a quaternary ammonium base; and n represents an integer from 1 to 3; provided that a plurality of $R^2$s may be the same or different when n is 2 or more; s and t for bonds represent 0 or 1, the sum of n, s, and t being 3).

In the aminosilyl group represented by formula (5), at least one bond other than the bond including $R^2$ is bonded to the inorganic filler with an oxygen atom interposed therebetween. All bonds other than the bond including $R^2$ may be bonded to the inorganic filler, or at least one bond other than the bond including $R^2$ may not be bonded to the inorganic filler. When at least one bond other than the bond including $R^2$ is not bonded to the inorganic filler, the bond not bonded to the inorganic filler may include a hydroxyl group or a hydrolyzable group, or may be bonded to another silyl group such as a hydrophobic silyl group.

In this embodiment, the carbon number of the hydrocarbon group $R^2$ having the amino group is preferably 3 or more and 12 or less, for example. By setting the carbon number of $R^2$ to 3 or more, the aminosilyl group can be bulky, which can cause steric hindrance on the surface of the inorganic filler. Thereby, the effect of the electrostatic repulsion between the amino groups can be efficiently caused. On the other hand, when the carbon number of $R^2$ is more than 12, the alkyl chain length becomes very long and the degree of freedom of movement of the methylene chain increases. For this reason, an excessive influence of the steric hindrance may be possibly exerted. As a result, the amount of modification with the aminosilane coupling agent or the like may be possibly decreased. For example, when the inorganic filler is surface-treated with both the aminosilane coupling agent and the hydrophobic silane coupling agent, it may possibly become difficult for a predetermined amount of the hydrophobic silyl group to be bonded to the surface of the inorganic filler. In contrast, by setting the carbon number of $R^2$ to 12 or less, the alkyl chain length can be suppressed from becoming excessively long and the degree of freedom of movement of the methylene chain can be suppressed from being excessively increased. Thereby, the excessive influence of a steric hindrance can be suppressed. As a result, the decrease in the amount of modification with the aminosilane coupling agent or the like can be suppressed. For example, when the inorganic filler is surface-treated with both the aminosilane coupling agent and the hydrophobic silane coupling agent described below, a predetermined amount of the hydrophobic silyl group can be bonded to the surface of the inorganic filler.

In this embodiment, the carbon number of each of $R^{1a}$, $R^{1b}$, and $R^{1c}$ included in the above-described hydrophobic silyl group is more preferably smaller than the carbon number of the hydrocarbon group $R^2$ having the amino group in the aminosilyl group, for example. By setting the carbon number of each of $R^{1a}$, $R^{1b}$, and $R^{1c}$ to be smaller than the carbon number of $R^2$, the aminosilyl group can be bulkier than the hydrophobic silyl group. Thereby, the effect of the electrostatic repulsion between the amino groups can be efficiently caused. Specifically, each of $R^{1a}$, $R^{1b}$, and $R^{1c}$ included in the hydrophobic silyl group is more preferably a methyl group or an ethyl group, for example.

In this embodiment, the molar fraction of the aminosilyl groups with respect to all of the silyl groups bonded to the surface of the inorganic filler (hereinafter also referred to as the "molar fraction of the aminosilyl groups") is, for example, 2% or more and 90% or less, and preferably 5% or more and 80% or less. The phrase, "the molar fraction of the aminosilyl groups", used herein, represents a rate, in %, of the mole number of the aminosilyl group with respect to the mole number of all of the silyl groups bonded to the surface of the inorganic filler.

When the molar fraction of the aminosilyl groups is less than 2%, the rate of change in the volume resistivity with respect to the molar fraction of the aminosilyl groups is high. Accordingly, the volume resistivity of the insulation layer 130 is likely to easily vary with respect to the manufacturing process-derived variation in the molar fraction of the aminosilyl groups. For this reason, an effect of improving the insulation property of the insulation layer 130 by giving the aminosilyl group to the inorganic filler may not be stably obtained. In contrast, in this embodiment, by setting the molar fraction of the aminosilyl groups to 2% or more, the effect of improving the insulation property of the insulation layer 130 can be stably obtained even when a predetermined manufacturing process-derived variation occurs in the molar fraction of the aminosilyl groups. Furthermore, in this embodiment, by setting the molar fraction of the aminosilyl groups to 5% or more, the effect of improving the insulation property of the insulation layer 130 can be significantly obtained.

On the other hand, when the molar fraction of the aminosilyl groups is more than 90%, hydrogen bonds are formed with amino groups interposed between particles, thereby electrostatic repulsion between the amino groups may be less likely to be caused. Moreover, due to the interparticle hydrogen bonds, a conductive path through the particle interface may be readily formed. For this reason, the effect of improving the insulation property of the insulation layer 130 by giving an aminosilyl group to the inorganic filler may not be sufficiently obtained. In contrast, in this embodiment, by setting the molar fraction of the aminosilyl groups to 90% or less, formation of the hydrogen bonds with amino groups interposed between particles can be suppressed, and electrostatic repulsion between amino groups can be sufficiently caused. Furthermore, formation of the conductive path through the particle interface due to the hydrogen bonds can be stably suppressed. Thereby, the effect of improving the insulation property of the insulation layer 130 can be sufficiently obtained. Furthermore, in this embodiment, by setting the molar fraction of the aminosilyl groups to 80% or less, the effect of improving the insulation property of the insulation layer 130 can be significantly obtained.

The molar fraction of the aminosilyl groups described above can be determined by the following method, for example.

Specifically, an inorganic filler is firstly prepared which is surface-treated with the hydrophobic silane coupling agent and the aminosilane coupling agent at a predetermined ratio. Next, elemental analysis of the surface of the inorganic filler is performed by gas chromatography using a thermal conductivity detector (TCD) under condition at the reaction temperature of 850° C. and the reduction temperature of 600° C. As a result, the mass ratio of nitrogen to carbon (hereinafter, N/C ratio) in the silyl group actually bonded to the surface of the inorganic filler is obtained.

On the other hand, a calibration curve of the N/C ratio with respect to the molar fraction of the aminosilyl groups is obtained by the following procedure. The hydrophobic silyl group is identified from the hydrophobic silane coupling agent used for the surface-treatment, and the total atomic weight $C_1$, of carbon per hydrophobic silyl group is determined. Further, the aminosilyl group is identified from the aminosilane coupling agent used for the surface-treatment, and the total atomic weight $C_2$ of carbon per aminosilyl group and the total atomic weight $N_2$ of nitrogen per aminosilyl group are determined. Let x be the molar fraction of the aminosilyl groups (in %) and y be the N/C ratio (in %). The N/C ratio, y, is represented by the following equation (6) as a function of the molar fraction of the aminosilyl group, x, which constitutes the calibration curve. Note that $C_1$ and $C_2$ in the following equation (6) are not the carbon number, respectively.

$$y=N_2x/\{(C_2-C_1)x+100C_1\} \quad (6)$$

(wherein $0<x\leq 100$).

In the equation (6), when the carbon number of the hydrophobic silyl group is equal to the carbon number of the aminosilyl group, that is, $C_1$ t $C_2$, the N/C ratio, y, is a linear function of the molar fraction of the aminosilyl group, x, that is, the calibration curve is linear.

For example, when the hydrophobic silyl group is a trimethylsilyl group ($C_1=36.03$) and the aminosilyl group is an aminopropylsilyl group ($C_2=36.03$), the calibration curve is linear. When the molar fraction of the aminosilyl group, x, is 100%, the theoretical value of the N/C ratio, y, is about 38.9%.

After the calibration curve is obtained as described above, the actually measured N/C ratio, y, is substituted in equation (6), which is the calibration curve. Thereby, the molar fraction of the aminosilyl group, x, in the silyl groups which are actually bonded to the surface of the inorganic filler is determined.

In this embodiment, it is preferred that the N/C ratio obtained by elemental analysis of the surface of the inorganic filler by gas chromatography described above be, for example, 0.7% or more and 35% or less, and preferably 1.9% or more and 31% or less (in the case where the aminosilyl group is an aminopropylsilyl group). Thereby, the molar fraction of the aminosilyl groups can be 2% or more and 90% or less, and preferably 5% or more and 80% or less.

In this embodiment, the mean volume diameter (MV) of the inorganic filler is not particularly limited, but is, for example, 1 μm or less, preferably 700 nm or less, and more preferably 100 nm or less.

The term, "mean volume diameter (MV)" used herein is determined by the following equation:

$$MV=\Sigma(V_id_i)/\Sigma V_i$$

wherein $d_i$ is a particle diameter of a particle and $V_i$ is a particle volume.

For a measurement of the mean volume diameter, a dynamic light scattering-type particle diameter/particle size distribution measuring device may be used.

By setting the mean volume diameter of the inorganic filler to 1 μm or less, an effect of suppressing the local accumulation of the space charge in the insulation layer 130 can be stably obtained. Furthermore, by setting the mean volume diameter of the inorganic filler to 700 nm or less, preferably 100 nm or less, an effect of suppressing the local accumulation of the space charge in the insulation layer 130 can be more stably obtained.

The lower limit of the mean volume diameter of the inorganic filler is also not particularly limited. However, from the viewpoint of stably forming the inorganic filler, the mean volume diameter of the inorganic filler is, for example, 1 nm or more, and preferably 5 nm or more.

In this embodiment, the content of the inorganic filler in the resin composition is not particularly limited. However, in the case where the surface of the inorganic filler includes only the hydrophobic silyl group, the content of the inorganic filler in the resin composition is preferably 0.1 parts by mass or more and 5 parts by mass or less with respect to 100 parts by mass of the base resin, for example. When the content of the inorganic filler is less than 0.1 parts by mass, the space charge may be insufficiently trapped by the inorganic filler. In contrast, by setting the content of the inorganic filler to 0.1 parts by mass or more, the space charge can be sufficiently trapped by the inorganic filler. On the other hand, in the case where the surface of the inorganic filler includes only the hydrophobic silyl group, when the content of the inorganic filler is more than 5 parts by mass, the insulation property of the insulation layer 130 may possibly decrease gradually. In contrast, by setting the content of the inorganic filler to 5 parts by mass or less, the decrease in the insulation property of the insulation layer 130 can be suppressed.

On the other hand, in the case where the surface of the inorganic filler includes both the hydrophobic silyl group and the aminosilyl group, the insulation property of the insulation layer 130 can be kept high even when the content of the inorganic filler in the resin composition is more than 5 parts by mass. This is considered because even when the content of the inorganic filler is increased, the interparticle electrostatic repulsion by the amino groups is large, so that the dispersibility of the inorganic filler in the resin composition can be maintained well.

Therefore, in the case where the surface of the inorganic filler includes both the hydrophobic silyl group and the aminosilyl group, the content of the inorganic filler in the resin composition can be, for example, 0.1 parts by mass or more and 10 parts by mass or less with respect to 100 parts by mass of the base resin. In the case where the surface of the inorganic filler includes both the hydrophobic silyl group and the aminosilyl group, the effect of the content of the inorganic filler being 0.1 parts by mass or more is similar to the effect obtained in the case where the surface of the inorganic filler includes only the hydrophobic silyl group. On the other hand, in the case where the surface of the inorganic filler includes both the hydrophobic silyl group and the aminosilyl group, by setting the content of the inorganic filler to 10 parts by mass or less, dispersibility of the inorganic filler in the insulation layer 130 can be improved while improving the moldability of the resin composition.

(Cross-Linking Agent)

In this embodiment, the resin composition may be non-cross-linked or cross-linked when the insulation layer 130 is formed. In either case, the effect of improving the insulation property of the insulation layer 130 by giving the hydrophobic silyl group to the inorganic filler can be obtained.

When the resin composition is cross-linked, the resin composition preferably contains, for example, organic peroxide as the cross-linking agent. Examples of the organic peroxide include, for example, dicumylperoxide, t-butyldicumylperoxide, di(t-butylperoxide), 2,5-dimethyl-2,5-di(t-butylperoxy)hexane, 1,3-bis(t-butylperoxyisopropyl)benzene, butyl 4,4-bis[(t-butyl)peroxy]pentanoate, 1,1-bis(1,1-dimethylethylperoxy)cyclohexane, and the like. Two or more of them may be used in combination.

(Other Additives)

The resin composition may further include, for example, an antioxidant and a lubricant.

Examples of the antioxidant include, for example, 2,2-thio-diethylene bis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4- hydroxyphenyl)propionate, 2,4-bis-[(octylthio)methyl]-o-cresol, 2,4-bis(n-octylthio)-6-(4-hydroxy-3,5-di-t-butylanilino)-1,3,5-triazine, bis[2-methyl-4-3-n-alkyl($C_{12}$ or $C_{14}$)thiopropionyloxy)-5-t-butylphenyl]sulfide, and 4,4'-thiobis(3-methyl-6-t-butylphenol), and the like. Two or more of them may be used in combination.

The lubricant acts to suppress aggregation of the inorganic filler and also improve the fluidity of the resin composition during extrusion molding of the insulation layer 130. A known material can be used for the lubricant of this embodiment.

The resin composition may further include a colorant, for example.

(2) DC Power Cable

Next, with reference to FIG. 1, the DC power cable of this embodiment will be described. FIG. 1 is a cross-sectional view perpendicular to the axial direction of the DC power cable of this embodiment.

The DC power cable 10 of this embodiment is configured as a so-called solid insulation DC power cable (cable for DC power transmission), and includes, for example, a conductor 110, an internal semiconductive layer 120, an insulation layer 130, an external semiconductive layer 140, a shielding layer 150, and a sheath 160.

(Conductor (Conductive Part))

The conductor 110 is configured by twisting together a plurality of conductor core wires (conductive core wires) including, for example, pure copper, copper alloy, aluminum, aluminum alloy, or the like.

(Internal Semiconductive Layer)

The internal semiconductive layer 120 is provided to cover the outer periphery of the conductor 110. In addition, the internal semiconductive layer 120 is configured to have semiconductivity and to suppress electric field concentration on the surface side of the conductor 110. The internal semiconductive layer 120 includes, for example, at least any one of ethylene-ethyl acrylate copolymer, ethylene-methyl acrylate copolymer, ethylene-butyl acrylate copolymer, and ethylene-vinyl acetate copolymer, together with conductive carbon black.

(Insulation Layer)

The insulation layer 130 is provided to cover the outer periphery of the internal semiconductive layer 120, and contains the resin composition described above. As described above, the insulation layer 130 may be non-cross-linked, or may be cross-linked by heating the resin composition of this embodiment after extrusion molding.

(External Semiconductive Layer)

The external semiconductive layer 140 is provided to cover the outer periphery of the insulation layer 130. In addition, the external semiconductive layer 140 is configured to have semiconductivity and to suppress electric field concentration between the insulation layer 130 and the shielding layer 150. The external semiconductive layer 140 contains, for example, the same material as that of the internal semiconductive layer 120.

(Shielding Layer)

The shielding layer 150 is provided to cover the outer periphery of the external semiconductive layer 140. The shielding layer 150 is, for example, configured by winding a copper tape, or configured as a wire shield formed by winding a plurality of soft copper wires. A tape including rubberized cloth or the like as a raw material may be wound inside or outside the shielding layer 150.

(Sheath)

The sheath 160 is provided to cover the outer periphery of the shielding layer 150. The sheath 160 contains, for example, polyvinyl chloride or polyethylene.

(Insulation Property)

In the DC power cable 10 configured as described above, since at least a part of the surface of the inorganic filler added into the insulation layer 130 includes a hydrophobic silyl group, for example, the following insulation property can be obtained.

In this embodiment, when the insulation layer 130 is formed with the resin composition described above and a sheet of the insulation layer 130 having a thickness of 0.2 mm is formed, the volume resistivity of the sheet of the insulation layer 130 as measured under the condition at the temperature of 80° C. and the DC field of 50 kV/mm is higher than the volume resistivity of the resin composition having the same configuration except that the inorganic filler is not surface-treated, as measured under the same condition.

Moreover, in this embodiment, when the insulation layer 130 is formed with the above-described resin composition in which the base resin contains LDPE and a sheet of the insulation layer 130 having a thickness of 0.2 mm is formed, the volume resistivity of the sheet of the insulation layer 130 is, for example, $8\times10^{15}$ Ω·cm or more, preferably $5\times10^{16}$ Ω·cm or more, and more preferably $1\times10^{17}$ Ω·cm or more, as measured under the condition at the temperature of 80° C. and the DC field of 50 kV/mm.

Moreover, in this embodiment, when the insulation layer 130 is formed with the above-described resin composition in which the base resin contains PP-based TPO and a sheet of the insulation layer 130 having a thickness of 0.2 mm is formed, the volume resistivity of the sheet of the insulation layer 130 is, for example, $5\times10^{15}$ Ω·cm or more, preferably $1.7\times10^{16}$ Ω·cm or more, and more preferably $2\times10^{16}$ Ω·cm or more, as measured under the condition at the temperature of 80° C. and the DC field of 50 kV/mm.

Since the higher upper limit of the volume resistivity of the insulation layer 130 is favored, the upper limit is not limited. However, the upper limit of the volume resistivity of the insulation layer 130 which is determined by optimization of the various conditions including the molar fraction of the aminosilyl group is, for example, a measurement upper limit, about $1\times10^{19}$ Ω·cm.

(Specific Dimensions and the Like)

Specific dimensions of the DC power cable 10 are not particularly limited. For example, the diameter of the conductor 110 is 5 mm or more and 60 mm or less, the thickness of the internal semiconductive layer 120 is 1 mm or more and 3 mm or less, the thickness of the insulation layer 130 is 1 mm or more and 35 mm or less, the thickness of the external semiconductive layer 140 is 1 mm or more and 3 mm or less, the thickness of the shielding layer 150 is 1 mm or more and 5 mm or less, and the thickness of the sheath 160 is 1 mm or more. The DC voltage applied to the DC power cable 10 of this embodiment is, for example, 20 kV or more.

(3) Method of Manufacturing DC Power Cable

Next, a method of manufacturing a DC power cable of this embodiment will be described. Hereinafter, the step is abbreviated as "S".

(S100: Resin Composition Preparation Step)

First, a resin composition including a base resin containing polyolefin, and an inorganic filler is prepared. The resin composition preparation step S100 includes, for example, a surface-treatment step S120 and a mixing step S140.

(S120: Surface-Treatment Step)

The inorganic filler is surface-treated with a hydrophobic silane coupling agent. Thereby, a hydrophobic silyl group derived from the hydrophobic silane coupling agent and represented by formula (1) can be bonded to at least a part of the surface of the inorganic filler.

The method of surface-treating the inorganic filler with the hydrophobic silane coupling agent (and an aminosilane coupling agent) may be either a dry method or a wet method. In the dry method, for example, a solution containing the silane coupling agent is added dropwise into a stirrer, or is sprayed using a sprayer, while stirring the inorganic filler in the stirrer such as a Henschel mixer. In the wet method, for example, an inorganic filler is added to a predetermined solvent to form a slurry, and a silane coupling agent is added into the slurry.

In this embodiment, the inorganic filler may be surface-treated not only with the hydrophobic silane coupling agent but also with the aminosilane coupling agent. Thereby, not only the hydrophobic silyl group having the hydrophobic group but also the aminosilyl group can be bonded to the surface of the inorganic filler.

Regarding the method of surface-treating the inorganic filler not only with the hydrophobic silane coupling agent but also with a aminosilane coupling agent, for example, the surface-treatment may be performed using the hydrophobic silane coupling agent and the aminosilane coupling agent simultaneously, or the surface-treatment may be performed using them separately at different timings. In the latter case, as for the order of the surface-treatment with the hydrophobic silane coupling agent and the surface-treatment with the aminosilane coupling agent, it does not matter which of the two is performed first.

At this time, in this embodiment, the inorganic filler is surface-treated with the hydrophobic silane coupling agent and the aminosilane coupling agent so that the molar fraction of the aminosilyl groups described above is, for example, 2% or more and 90% or less, and preferably 5% or more and 80% or less. Specifically, the compounded amount of the hydrophobic silane coupling agent and the compounded amount of the aminosilane coupling agent are respectively set based on $R^1$ included in the hydrophobic silane coupling agent and $R^2$ included in the aminosilane coupling agent so that the molar fraction of the aminosilyl groups falls within the above-described range.

After the surface-treatment is performed with a predetermined silane coupling agent, the inorganic filler after the treatment is dried as needed.

After the surface-treatment step S120 is completed, the mean volume diameter of the inorganic filler may be adjusted by performing a predetermined pulverization treatment. At this time, the mean volume diameter of the inorganic filler is, for example, 1 μm or less, preferably 700 nm or less, and more preferably 100 nm or less.

(S140: Mixing Step)

After the surface-treatment step S120 is completed, the base resin containing polyethylene, the inorganic filler, and other additives (an antioxidant, a lubricant, etc.) are mixed (kneaded) by a mixer such as a Banbury mixer or kneader, to form a mixed material. After the mixed material is formed, the mixed material is granulated by an extruder. As a result, a pellet-like resin composition that is to form the insulation layer 130 is formed. The steps from the mixing step through the granulation step may be collectively performed using a twin-screw type extruder with high kneading performance.

(S200: Conductor Preparation Step)

Meanwhile, a conductor 110 is prepared which is formed by twisting a plurality of conductor core wires.

(S300: Cable Core Formation Step (Extrusion Step))

After the resin composition preparation step S100 and the conductor preparation step S200 are completed, for example, a resin composition for the internal semiconductive layer in which ethylene-ethyl acrylate copolymer and electrically conductive carbon black are mixed in advance is charged into an extruder A of a three-layer coextruder, the extruder A forming the internal semiconductive layer 120.

The pellet-like resin composition described above is charged into an extruder B forming the insulation layer 130.

A resin composition for the external semiconductive layer is charged into an extruder C forming the external semiconductive layer 140, the composition including materials similar to those of the resin composition for the internal semiconductive layer charged into the extruder A.

Then, the respective extrudates from the extruders A to C are guided to a common head, and the internal semiconductive layer 120, the insulation layer 130, and the external semiconductive layer 140, outwardly from the inside, are simultaneously extruded on the outer periphery of the conductor 110.

When the insulation layer 130 is to be cross-linked, after extrusion, the insulation layer 130 is cross-linked by heating by radiation from an infrared heater or heat-transferring through a heat medium such as high-temperature nitrogen gas or silicone oil, in a cross-linking tube pressurized with nitrogen gas.

The cable core including the conductor 110, the internal semiconductive layer 120, the insulation layer 130, and the external semiconductive layer 140 is formed by the cable core formation step S300 described above.

(S400: Shielding Layer Formation Step)

After the cable core is formed, the shielding layer 150 is formed on the outside of the external semiconductive layer 140, for example, by winding a copper tape therearound.

(S500: Sheath Formation Step)

After the shielding layer 150 is formed, vinyl chloride is charged into an extruder and extruded from the extruder, to form a sheath 160 on the outer periphery of the shielding layer 150.

As described above, the DC power cable 10 as the solid insulation DC power cable is manufactured.

(4) Effect According to the Embodiment

According to this embodiment, one or more effects described below are achieved.

(a) In this embodiment, since the inorganic filler is surface-treated with the hydrophobic silane coupling agent described above, at least a part of the surface of the inorganic filler includes the hydrophobic silyl group derived from the hydrophobic silane coupling agent and represented by formula (1). Thereby, the hydrophobicity on the surface of the inorganic filler can be improved.

Alkoxysilane or halogenated silane is discussed here as an example of the hydrophobic silane coupling agent. When the inorganic filler is surface-treated with alkoxysilane or halogenated silane, a hydroxyl group generated in the silane coupling agent by hydrolysis may not undergo dehydration condensation with the hydroxyl group on the surface of the inorganic filler and remains in the silyl group in some cases. Alternatively, some hydrolyzable groups (alkoxy groups or halogen groups) in alkoxysilane or halogenated silane may not be hydrolyzed but remain in the silyl group. In such a case, the hydrophobicity on the surface of the inorganic filler may not be sufficiently obtained. For this reason, the compatibility of the inorganic filler with the base resin may be reduced. In the case where the hydroxyl group remains, the inorganic filler may be aggregated due to hydrogen bonds.

In addition, alkoxysilane or halogenated silane may have a number of hydrolyzable groups per molecule. In such a case, a plurality of bonds of a single silyl group may possibly be bonded to the inorganic fillers. Accordingly, it becomes difficult to bind a number of silyl groups to the surface of the inorganic filler. Again, for this reason, hydrophobicity on the surface of the inorganic filler may not be sufficiently obtained.

In contrast, in this embodiment, at least a part of the surface of the inorganic filler includes the hydrophobic silyl group represented by formula (1). Namely, in the hydrophobic silyl group, three hydrophobic groups are bonded to a silicon atom. In other words, neither a hydroxyl group nor a hydrolyzable group is bonded to the silicon atom of the hydrophobic silyl group (neither a hydroxyl group nor a hydrolyzable group remains in the silicon atom of the hydrophobic silyl group). Thereby, the hydrophobicity on the surface of the inorganic filler can be improved. The improved hydrophobicity on the surface of the inorganic filler can improve the compatibility of the inorganic filler with the base resin. In addition, the absence of a hydroxyl group in the hydrophobic silyl group bonded to the surface of the inorganic filler can suppress aggregation of the inorganic filler due to hydrogen bonds. Improvement in the compatibility of the inorganic filler and suppression of hydrogen bonds can improve the dispersibility of the inorganic filler in the resin composition.

In this embodiment, the hydrophobic silyl group represented by the formula (1) has one bond to be bonded to the inorganic filler. Therefore, many hydrophobic silyl groups can be bonded to the surface of the inorganic filler. In other words, the hydrophobicity on the surface of the inorganic filler can be efficiently improved. Again, for this reason, dispersibility of the inorganic filler in the resin composition can be improved.

As described above, by improving the dispersibility of the inorganic filler in the resin composition, the space charge can be suppressed from locally accumulating in the insulation layer 130 and the leakage current can be suppressed from occurring, during electric charging. As a result, the insulating property of the insulating layer 130 can be stably improved.

(b) In this embodiment, since the inorganic filler is surface-treated not only with the above-described hydrophobic silane coupling agent but also with the aminosilane coupling agent, another part of the surface of the inorganic filler includes an aminosilyl group having an amino group derived from the aminosilane coupling agent. Since the amino group bonded to the inorganic filler has an electron donating property, the surface of the inorganic filler can be positively charged. Thereby, when the inorganic fillers are adjacent to each other, electrostatic repulsion between the amino groups on the surfaces of the inorganic fillers can be caused. With the electrostatic repulsion between the inorganic fillers, dispersibility of the inorganic filler in the resin composition can be improved. As a result, the insulation property of the insulation layer 130 can be stably improved.

Since another part of the surface of the inorganic filler includes the aminosilyl group, the insulation property of the insulation layer 130 is improved. As a mechanism thereof, for example, the following two mechanisms are conceivable, in addition to the "electrostatic repulsion between the amino groups" described above.

Since another part of the surface of the inorganic filler includes an aminosilyl group, the crystal structure of the base resin can be changed in the vicinity of the particles of the inorganic filler. For example, since the inorganic filler particles including aminosilyl groups are included in the base resin phase, the crystallinity can be increased in the vicinity of the interface between the inorganic filler and the base resin. That is, free volume voids which can be involved in electrical conduction can be reduced. As a result, it is considered that the insulation property of the insulation layer 130 can be stably improved.

Alternatively, since another part of the surface of the inorganic filler includes an aminosilyl group, the conductive carrier (space charge) can be easily captured by the amino group. Accordingly, the space charge can be suppressed from locally accumulating in the insulation layer 130 and the leakage current can be suppressed from occurring, during electric charging. As a result, it is considered that the insulation property of the insulation layer 130 can be stably improved.

(c) Since the inorganic filler is surface-treated with both the above-described hydrophobic silane coupling agent and the aminosilane coupling agent, the aminosilyl group can be suppressed from being exclusively and excessively bonded to the surface of the inorganic filler. Thereby, formation of the hydrogen bonds with amino groups interposed between particles can be suppressed, and electrostatic repulsion between amino groups can be sufficiently caused. Furthermore, formation of the conductive path through the particle interface due to the hydrogen bonds can be suppressed. In other words, the electrostatic repulsion effect between the aminosilyl groups can be sufficiently obtained while the effect of improving the hydrophobicity by the hydrophobic silyl group is obtained. As a result, the insulation property of the insulation layer 130 can be significantly improved.

(d) The ratio of the aminosilyl groups with respect to all of the silyl groups bonded to the surface of the inorganic filler is 2% or more and 90% or less. Since the molar fraction of the aminosilyl groups is 2% or more, the effect of improving the insulation property of the insulation layer 130 by giving an aminosilyl group to the inorganic filler can be stably obtained even when a predetermined manufacturing process-derived variation occurs in the molar fraction of the aminosilyl groups. Since the molar fraction of the aminosilyl groups is 90% or less, formation of the hydrogen bonds with amino groups interposed between particles can be suppressed, and electrostatic repulsion between amino groups can be sufficiently caused. Furthermore, formation of the conductive path through the particle interface due to the hydrogen bonds can be stably suppressed. Thereby, the effect of improving the insulation property of the insulation layer 130 can be sufficiently obtained.

Other Embodiments According to the Disclosure

Although the present disclosure has been specifically described, the present disclosure is not limited to the embodiments described above, and various modifications can be made without departing from the scope of the present disclosure.

EXAMPLE

Next, examples according to the present disclosure will be described. These examples are illustrative of the present disclosure, and the present disclosure is not limited by these examples.

Experiment 1

First, in order to evaluate the dependence of the insulation property on the silane coupling agent and the dependence of the insulation property on the base resin, the following Experiment 1 was performed.

(1-1) Fabrication of Sheet Sample of Resin Composition

The following materials for each of samples A1 to A6 were roll-mixed to form a resin composition. After a resin composition was formed, the resin composition was pressed by press molding at 120° C. for 10 minutes, to make a sheet of the resin composition having a thickness of 0.2 mm. In Experiment 1, since the cross-linking agent was not added and the heating temperature during pressing was less than 180° C., the base resin was non-cross-linked. Detailed conditions are as follows.

[Sample A1]
(Base Resin)
  Low-density polyethylene (LDPE): Sumicasen C215 manufactured by SUMITOMO CHEMICAL COMPANY, LIMITED (density, d=920 kg/m$^3$; MFR=1.4 g/10 min) 100 parts by mass
(Inorganic Filler)
  Not added
[Sample A2]
(Base Resin)
  Same as sample A1
(Inorganic Filler)
  Magnesium oxide: Magnesium oxide manufactured by a vapor phase method (mean volume diameter 50 nm) 1 part by mass
  Note that, surface-treatment with a silane coupling agent was not performed.

Regarding the following samples A3 to A7, the conditions were equivalent to the condition for sample A2 except that the inorganic filler was surface-treated with a predetermined silane coupling agent by a dry method. The silane coupling agents used in the surface-treatment of the inorganic filler are as follows.

[Sample A3]
  Silane coupling agent:
    Hexamethyldisilazane only as a hydrophobic silane coupling agent
[Sample A4]
  Silane coupling agent:
    3-Aminopropyltrimethoxysilane as an aminosilane coupling agent
    Hexamethyldisilazane as a hydrophobic silane coupling agent
  The compounded amounts of the aminosilane coupling agent and the hydrophobic silane coupling agent were set so that the molar fraction of the aminosilyl groups was 12%.
[Sample A5]
  Silane coupling agent:
    Trimethoxy-n-octylsilane
[Sample A6]
  Silane coupling agent:
    3-Methacryloxypropyltrimethoxysilane In the following samples B1 to B6, the other conditions except for the base resin were equivalent to those in samples A1 to A6, respectively.
[Samples B1 to B6]
(Base Resin)
  PP-based TPO:
    THERMORUN 5013 (density, d=880 kg/m$^3$, MFR=1 g/10 min) 100 parts by mass (1-2) Evaluation The volume resistivity of the sheet of each sample described above is measured, by using a plate electrode with a guard having a diameter of 65 mm in an atmosphere at the temperature of 80° C. and applying a DC field of 50 kV/mm to the sheet. In Experiments 2 to 4 described later, the evaluations similar to that in Experiment 1 were performed.

(1-3) Results

With reference to Table 1 and Table 2 shown below, the result of the evaluation of each sample in Experiment 1 will be described. In the tables shown below, the content of the compounded agent is expressed in "parts by mass" (the same applies in the subsequent experiments). In addition, the parenthesized item subsequent to the term "magnesium oxide" indicates a silane coupling agent used for the surface-treatment of the inorganic filler.

TABLE 1

| | Sample A1 | Sample A2 | Sample A3 | Sample A4 | Sample A5 | Sample A6 |
|---|---|---|---|---|---|---|
| LDPE | 100 | 100 | 100 | 100 | 100 | 100 |
| Magnesium oxide (without surface-treatment) | | 1 | | | | |
| Magnesium oxide (only hexamethyldisilazane) | | | 1 | | | |
| Magnesium oxide (3-aminopropyltrimethoxysilane + hexamethyldisilazane) | | | | 1 | | |
| Magnesium oxide (trimethoxy-n-octylsilane) | | | | | 1 | |
| Magnesium oxide (3-methacryloxypropyltrimethoxysilane) | | | | | | 1 |
| Volume resistivity (@80° C.) (Ω·cm) | $1.3 \times 10^{14}$ | $5.3 \times 10^{14}$ | $2.9 \times 10^{16}$ | $6.4 \times 10^{18}$ | $6.5 \times 10^{14}$ | $1.2 \times 10^{15}$ |

TABLE 2

| | Sample B1 | Sample B2 | Sample B3 | Sample B4 | Sample B5 | Sample B6 |
|---|---|---|---|---|---|---|
| TPO | 100 | 100 | 100 | 100 | 100 | 100 |
| Magnesium oxide (without surface-treatment) | | 1 | | | | |
| Magnesium oxide (only hexamethyldisilazane) | | | 1 | | | |
| Magnesium oxide (3-aminopropyltrimethoxysilane + hexamethyldisilazane) | | | | 1 | | |
| Magnesium oxide (trimethoxy-n-octylsilane) | | | | | 1 | |
| Magnesium oxide (3-methacryloxypropyltrimethoxysilane) | | | | | | 1 |
| Volume resistivity (@80° C.) (Ω·cm) | $6.0 \times 10^{14}$ | $1.3 \times 10^{15}$ | $1.1 \times 10^{16}$ | $5.5 \times 10^{16}$ | $7.0 \times 10^{15}$ | $2.2 \times 10^{15}$ |

As shown in Table 1, when the base resin was LDPE, the volume resistivity of each of samples A3 and A4 in which magnesium oxide was surface-treated with hexamethyldisilazane was greatly increased compared to the volume resistivity of each of sample A1 in which the inorganic filler was not added and sample A2 in which the inorganic filler was not surface-treated. In addition, the volume resistivity of each of samples A3 and A4 was higher than the volume resistivity of each of samples A5 and A6 in which magnesium oxide was surface-treated with another silane coupling agent.

According to the results of sample A3 and sample A4, since the inorganic filler is surface-treated with hexamethyldisilazane, a trimethylsilyl group can be given to at least a part of the surface of the inorganic filler. It was confirmed that since at least a part of the surface of the inorganic filler includes a hydrophobic silyl group represented by formula (1), the insulation property of the resin composition can be improved.

In addition, as shown in Table 2, when the base resin was TPO, as with the case where the base resin was LDPE, the volume resistivity of each of samples B3 and B4 in which magnesium oxide was surface-treated with hexamethyldisilazane was greatly increased compared to the volume resistivity of each of sample B1 in which the inorganic filler was not added and sample B2 in which the inorganic filler was not surface-treated. In addition, the volume resistivity of each of samples B3 and B4 was higher than the volume resistivity of each of samples B5 and B6 in which magnesium oxide was surface-treated with another silane coupling agent.

According to the results of samples B3 and B4, it was confirmed that the effect of improving the insulation property of the resin composition by giving a hydrophobic silyl group represented by formula (1) to the inorganic filler can be obtained even when the base resin was another polyolefin such as TPO.

Experiment 2

Next, in order to evaluate the dependence of the insulation property on the type of the inorganic filler, the following Experiment 2 was performed.

(2-1) Fabrication of Sheet Sample of Resin Composition

In the following samples C1 to C4, the base resin was LDPE, and the inorganic filler was surface-treated with the same silane coupling agents as those in sample A4 (3-aminopropyltrimethoxysilane and hexamethyldisilazane).

[Sample C1]
The configuration was the same as that for sample A4 (using magnesium oxide).
In the following samples C2 to C4, the conditions except for the inorganic filler were equivalent to those in sample C1.

[Sample C2]
(Inorganic Filler)
  Silicon dioxide:
    Fumed silica (mean volume diameter, 12 nm)
      1 part by mass

[Sample C3]
(Inorganic Filler)
  Zinc oxide: (mean volume diameter, 40 nm)
    1 part by mass

[Sample C4]
(Inorganic Filler)
  Aluminum oxide: (mean volume diameter, 13 nm)
    1 part by mass In samples C5 to C8, the conditions other than the point that the base resin was TPO were equivalent to those in samples C1 to C4, respectively.

(2-2) Results

With reference to Table 3 and Table 4 shown below, the result of the evaluation of each sample in Experiment 2 will be described. In Table 3 and Table 4, the parenthesized item subsequent to the inorganic filler indicates a silane coupling agent used for the surface-treatment of the inorganic filler.

TABLE 3

| | Sample C1 | Sample C2 | Sample C3 | Sample C4 |
|---|---|---|---|---|
| LDPE | 100 | 100 | 100 | 100 |
| Magnesium oxide (3-aminopropyltrimethoxysilane + hexamethyldisilazane) | 1 | | | |
| Silicon dioxide (3-aminopropyltrimethoxysilane + hexamethyldisilazane) | | 1 | | |
| Zinc oxide (3-aminopropyltrimethoxysilane + hexamethyldisilazane) | | | 1 | |
| Aluminum oxide (3-aminopropyltrimethoxysilane + hexamethyldisilazane) | | | | 1 |
| Volume resistivity (@80° C.) ($\Omega \cdot cm$) | $6.4 \times 10^{18}$ | $6.1 \times 10^{18}$ | $8.9 \times 10^{17}$ | $7.3 \times 10^{17}$ |

TABLE 4

| | Sample C5 | Sample C6 | Sample C7 | Sample C8 |
|---|---|---|---|---|
| TPO | 100 | 100 | 100 | 100 |
| Magnesium oxide (3-aminopropyltrimethoxysilane + hexamethyldisilazane) | 1 | | | |
| Silicon dioxide (3-aminopropyltrimethoxysilane + hexamethyldisilazane) | | 1 | | |
| Zinc oxide (3-aminopropyltrimethoxysilane + hexamethyldisilazane) | | | 1 | |
| Aluminum oxide (3-aminopropyltrimethoxysilane + hexamethyldisilazane) | | | | 1 |
| Volume resistivity (@80° C.) ($\Omega \cdot cm$) | $5.5 \times 10^{16}$ | $5.2 \times 10^{16}$ | $4.4 \times 10^{16}$ | $3.7 \times 10^{16}$ |

As shown in Table 3, when the base resin was LDPE, the volume resistivity of each of samples C2 to C4 in which the inorganic filler was an inorganic powder other than magnesium oxide was almost equivalent to the volume resistivity of sample C1 in which the inorganic filler was magnesium oxide.

As shown in Table 4, when the base resin was TPO, the volume resistivity of each of samples C6 to C8 in which the inorganic filler was an inorganic powder other than magnesium oxide was almost equivalent to the volume resistivity of sample C5 in which the inorganic filler was magnesium oxide.

According to the results of samples C1 to C8, it was confirmed that the effect of improving the insulation property of the resin composition by giving a hydrophobic silyl group represented by formula (1) to the inorganic filler can be obtained even when the inorganic filler is an inorganic powder other than magnesium oxide.

Experiment 3

Next, in order to evaluate the dependence on the cross-linked state of the base resin, the following Experiment 3 was performed.

(3-1) Fabrication of Sheet Sample of Resin Composition

In the following samples D1 and D2, the base resin was LDPE, and the inorganic filler was magnesium oxide, and the inorganic filler was surface-treated with the same silane coupling agents as those in sample A4 (3-aminopropyltrimethoxysilane and hexamethyldisilazane).

[Sample D1]

Under the same condition as that in sample A4 (non-cross-linked), a sheet of the resin composition was fabricated.

[Sample D2]

(Additives)

Cross-linking agent:
Dicumylperoxide
1.3 parts by mass
Antioxidant:
4,4'-Thiobis (3-methyl-6-t-butylphenol) (TBMTBP)
0.22 parts by mass (Condition for Fabricating Sheet)

After the resin composition was formed, the resin composition was pressed by press molding at 180° C. for 30 minutes, to make a sheet of the resin composition having a thickness of 0.2 mm. The base resin was cross-linked by heating at 180° C. for 30 minutes. Thereafter, in order to remove the residue of the cross-linking agent, the sheet was vacuum dried at 80° C. for 24 hours.

In samples D3 and D4, the conditions except that the base resin was TPO were equivalent to those in samples D1 and D2, respectively.

(3-2) Results

With reference to Table 5 shown below, the result of the evaluation of each sample in Experiment 2 will be described.

TABLE 5

|  | Sample D1 | Sample D2 | Sample D3 | Sample D4 |
|---|---|---|---|---|
| LDPE | 100 | 100 | | |
| TPO | | | 100 | 100 |
| Cross-linking agent (dicumylperoxide) | | 1.3 | | 1.3 |
| Antioxidant (TBMTBP) | | 0.22 | | 0.22 |
| Cross-linked state of the base resin | non-cross-linked | cross-linked | non-cross-linked | cross-linked |
| Volume resistivity (@80° C.) (Ω · cm) | 6.4 × $10^{18}$ | 4.2 × $10^{18}$ | 8.9 × $10^{17}$ | 5.2 × $10^{17}$ |

As shown in Table 5, the volume resistivities of samples D2 and D4 in which the base resin was cross-linked were almost equivalent to the volume resistivities of samples D1 and D3 in which the base resin was not cross-linked, respectively.

According to the results of samples D1 to D4, it was confirmed that the effect of improving the insulation property of the resin composition by giving a hydrophobic silyl group represented by formula (1) to the inorganic filler can be obtained irrespective of the cross-linked state of the base resin.

Experiment 4

Next, in order to evaluate the dependence of the insulation property on the ratio of the aminosilyl groups, the following Experiment 4 was performed.

(4-1) Fabrication of Sheet Sample of Resin Composition

In the following samples E1 to E6, the base resin was LDPE and the inorganic filler was magnesium oxide.

[Sample E1]

The configuration was the same as that for sample A1 (without inorganic filler added thereto).

[Sample E2]

The configuration was the same as that for sample A2 (without surface-treatment).

[Sample E3]

The configuration was the same as that for sample A3.

That is, the surface-treatment of the inorganic filler was performed using only hexamethyldisilazane as the silane coupling agent. Therefore, the molar fraction of the aminosilyl groups was 0%.

[Sample E4]

The configuration was the same as that for sample A4.

That is, the compounded amounts of the aminosilane coupling agent and the hydrophobic silane coupling agent were set so that the molar fraction of the aminosilyl groups was 12%.

[Sample E5]

Using the same silane coupling agents as those in sample E4, the compounded amounts of the aminosilane coupling agent and the hydrophobic silane coupling agent were set so that the molar fraction of the aminosilyl groups was 45%.

[Sample E6]

The surface-treatment of the inorganic filler was performed using only the aminosilane coupling agent. Therefore, the molar fraction of the aminosilyl groups was 100%.

In samples E7 to E12, the conditions except that the base resin was TPO were equivalent to those in samples E1 to E6, respectively.

(4-2) Evaluation

In addition to the measurement of the volume resistivity described above, regarding samples E4, E5, E10, and E11, the N/C ratio was measured, and the molar fraction of the aminosilyl groups was obtained based on the measured N/C ratio.

Specifically, the elemental analysis of the surface of the inorganic filler was performed by gas chromatography using TCD under condition at the reaction temperature of 850° C. and the reduction temperature of 600° C. Thereby, the N/C ratio in the silyl groups that were actually bonded to the surface of the inorganic filler was determined. The detailed conditions of the device and the like are as follows.

Instrument: Oxygen circulating combustion/TCD detection type NCH quantitative analyzing instrument SUMIGRAPH NCH-22F (Sumika Chemical Analysis Service, Ltd.)

Measurement condition:
Reaction temperature: 850° C.
Reduction temperature: 600° C.
Separation/detection:
Porous polymer beads-packed column/TCD
Standard sample:
Standard sample for elemental determination, acetanilide On the other hand, based on the aminosilane coupling agent and the hydrophobic silane coupling agent used in Experiment 4, the N/C ratio, y, is expressed by the following equation (6)' as a function of the molar fraction of the aminosilyl group, x.

$$Y=0.0039x \qquad (6)'$$

(wherein $0<x\leq100$).

The actually measured N/C ratio, y, was substituted in equation (6)', which is the calibration curve, to determine the molar fraction of the aminosilyl groups, x, in the silyl groups that were actually bonded to the surface of the inorganic filler.

(4-3) Results

Figure 2A:
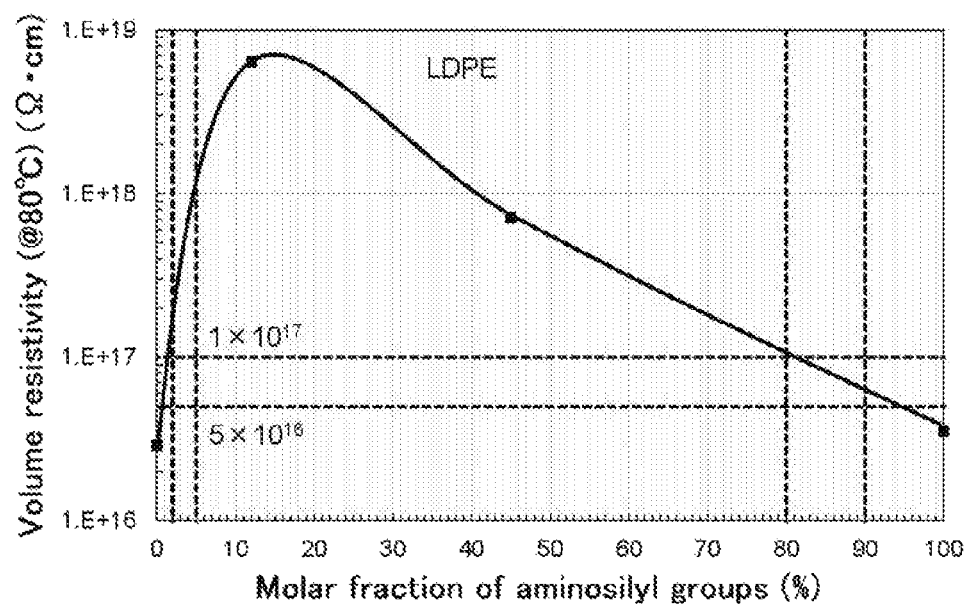
FIG. 2A is a diagram showing a volume resistivity with respect to a molar fraction of aminosilyl groups when the base resin contains low density polyethylene in Experiment 4.
Figure 2B:
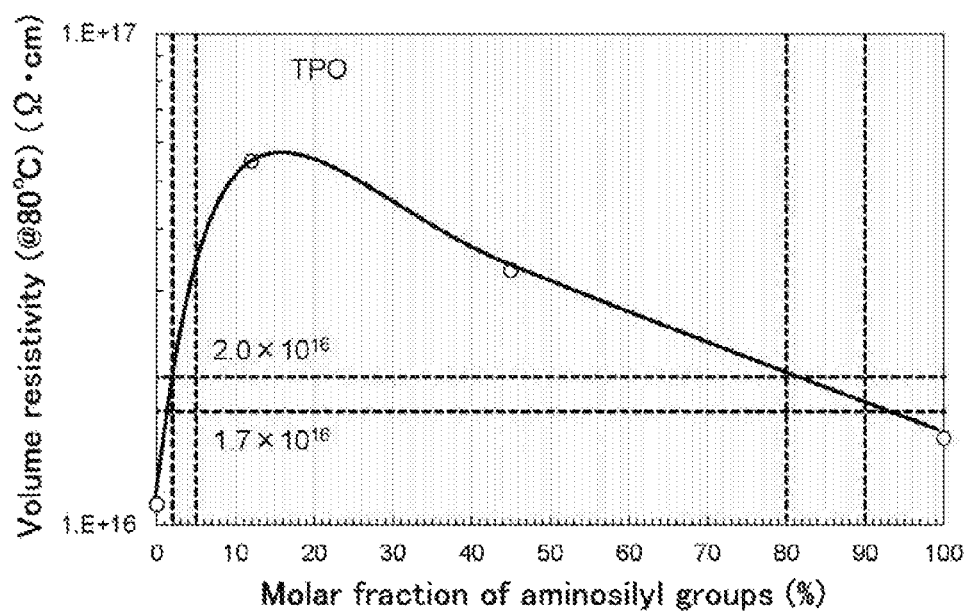
FIG. 2B is a diagram showing a volume resistivity with respect to a molar fraction of aminosilyl groups when the base resin contains a thermoplastic olefinic elastomer in Experiment 4.

With reference to the following Table 6 and Table 7, FIG. 2A and FIG. 2B, the evaluation result of each sample in Experiment 4 will be described. In Table 6 and Table 7, the parenthesized item subsequent to the term "magnesium oxide" indicates the absence of the surface-treatment or a molar fraction of the aminosilyl groups. FIG. 2A and FIG. 2B are diagrams showing volume resistivity with respect to the molar fraction of the aminosilyl groups when the base resin contains LDPE and when the base resin contains TPO, respectively, in Experiment 4. In FIG. 2A and FIG. 2B, the horizontal axis represents the molar fraction of the aminosilyl groups, and the vertical axis represents the volume resistivity. FIG. 2A and FIG. 2B show samples E3 to E6 in which the base resin contains LDPE and samples E9 to E12 in which the base resin contains TPO, respectively. FIG. 2A and FIG. 2B show samples E3 to E6 in which the base resin contains LDPE and samples E9 to E12 in which the base resin contains TPO, respectively.

convex upward with respect to the molar fraction of the aminosilyl groups. It was suggested that volume resistivity is maximized, when the molar fraction of the aminosilyl groups is around 12%. In addition, as shown in FIG. 2A, when the base resin contained LDPE, it was confirmed that the volume resistivity can be $5 \times 10^{16}$ $\Omega$·cm or more by setting the molar fraction of the aminosilyl groups to 2% or more and 90% or less. When the base resin contained LDPE, it was further confirmed that the volume resistivity can be $1 \times 10^{17}$ $\Omega$·cm or more by setting the molar fraction of the aminosilyl groups to 5% or more and 80% or less.

According to the results of samples E3 to E6, when the base resin contained LDPE, it was confirmed that the effect of improving the insulation property of the resin composition can be obtained irrespective of the molar fraction of the aminosilyl groups, by binding at least one of the hydrophobic silyl group and the aminosilyl group to the surface of the inorganic filler. In addition, according to FIG. 2A, when the base resin contained LDPE, it was confirmed that the effect of improving the insulation property of the resin composition can be further stably obtained by setting the molar fraction of the aminosilyl groups to 2% or more and 90% or

TABLE 6

|  | Sample E1 | Sample E2 | Sample E3 | Sample E4 | Sample E5 | Sample E6 |
| --- | --- | --- | --- | --- | --- | --- |
| LDPE | 100 | 100 | 100 | 100 | 100 | 100 |
| Magnesium oxide (without surface-treatment) |  | 1 |  |  |  |  |
| Magnesium oxide (molar fraction of aminosilyl groups: 0%) |  |  | 1 |  |  |  |
| Magnesium oxide (molar fraction of aminosilyl groups: 12%) |  |  |  | 1 |  |  |
| Magnesium oxide (molar fraction of aminosilyl groups: 45%) |  |  |  |  | 1 |  |
| Magnesium oxide (molar fraction of aminosilyl groups: 100%) |  |  |  |  |  | 1 |
| Volume resistivity (@80° C.) ($\Omega$·cm) | $1.3 \times 10^{14}$ | $5.3 \times 10^{14}$ | $2.9 \times 10^{16}$ | $6.4 \times 10^{18}$ | $7.1 \times 10^{17}$ | $3.5 \times 10^{16}$ |

TABLE 7

|  | Sample E7 | Sample E8 | Sample E9 | Sample E10 | Sample E11 | Sample E12 |
| --- | --- | --- | --- | --- | --- | --- |
| TPO | 100 | 100 | 100 | 100 | 100 | 100 |
| Magnesium oxide (without surface-treatment) |  | 1 |  |  |  |  |
| Magnesium oxide (molar fraction of aminosilyl groups: 0%) |  |  | 1 |  |  |  |
| Magnesium oxide (molar fraction of aminosilyl groups: 12%) |  |  |  | 1 |  |  |
| Magnesium oxide (molar fraction of aminosilyl groups: 45%) |  |  |  |  | 1 |  |
| Magnesium oxide (molar fraction of aminosilyl groups: 100%) |  |  |  |  |  | 1 |
| Volume resistivity (@80° C.) ($\Omega$·cm) | $9.0 \times 10^{14}$ | $1.3 \times 10^{15}$ | $1.1 \times 10^{16}$ | $5.5 \times 10^{16}$ | $3.3 \times 10^{16}$ | $1.5 \times 10^{16}$ |

Regarding samples E4, E5, E10, and E11, the N/C ratio was measured, and the molar fraction of the aminosilyl groups was calculated by substituting the measured N/C ratio into equation (6)'. As a result, it was confirmed that the molar fraction of the aminosilyl groups assumed at the time of surface-treatment was obtained.

As shown in Table 6, when the base resin contained LDPE, the volume resistivities of each of samples E3 to E6 in which magnesium oxide was surface-treated with at least one of the hydrophobic silane coupling agent and the aminosilane coupling agent, was greatly increased compared to the volume resistivity of each of sample E1 in which the inorganic filler was not added and sample E2 in which the inorganic filler was non-surface-treated.

As shown in FIG. 2A, when the base resin contained LDPE, the volume resistivity showed a tendency to be less. Furthermore, it was confirmed that the effect of improving the insulation property of the resin composition can be significantly obtained by setting the molar fraction of the aminosilyl groups to 5% or more and 80% or less.

As shown in Table 6, when the base resin contained TPO, as with the case when the base resin contained LDPE, the volume resistivity of each of samples E9 to E12 in which magnesium oxide was surface-treated with at least one of the hydrophobic silane coupling agent and the aminosilane coupling agent was greatly increased compared to the volume resistivity of each of sample E7 in which the inorganic filler was not added and sample E8 in which the inorganic filler was not surface-treated.

As shown in FIG. 2B, when the base resin contained TPO, as with the case when the base resin contained LDPE, the volume resistivity showed a tendency to be convex upward with respect to the molar fraction of the aminosilyl groups. It was suggested that volume resistivity is maximized, when the molar fraction of the aminosilyl groups is around 12%. In addition, as shown in FIG. 2B, when the base resin contained TPO, it was confirmed that the volume resistivity can be $1.7 \times 10^{16}$ 1-cm or more by setting the molar fraction of the aminosilyl groups to 2% or more and 90% or less. When the base resin contained TPO, it was further confirmed that the volume fraction can be $2 \times 10^{16}$ Ω·cm or more by setting the molar fraction of the aminosilyl groups to 5% or more and 80% or less.

According to the results of samples E9 to E12, even when the base resin contained polyolefin other than LDPE, it was confirmed that the effect of improving the insulation property of the resin composition can be obtained irrespective of the molar fraction of the aminosilyl groups by binding at least one of the hydrophobic silyl group and the aminosilyl group to the surface of the inorganic filler. Further, according to FIG. 2B, even when the base resin contained polyolefin other than LDPE, it was confirmed that the effect of improving the insulation property of the resin composition can be stably obtained by setting the molar fraction of the aminosilyl groups to 2% or more and 90% or less, and preferably 5% or more and 80% or less.

Experiment 5

Figure 3:
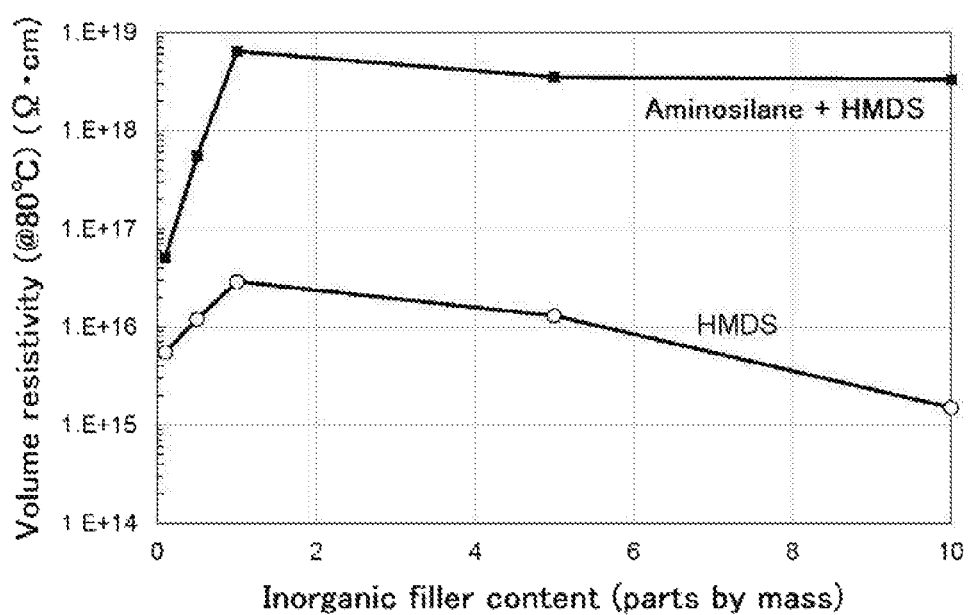
FIG. 3 is a diagram showing a volume resistivity with respect to a content of the inorganic filler in Experiment 5.

Next, in order to evaluate the dependence of the insulation property on the content of the inorganic filler, the following Experiment 5 was performed.
(5-1) Fabrication of Sheet Sample of Resin Composition
In the following samples F1 to F5, the base resin was LDPE.
[Sample F1]
(Inorganic Filler)
  Magnesium oxide:
    Magnesium oxide manufactured by vapor phase method (mean volume diameter, 50 nm)
      0.1 parts by mass
  Silane coupling agent:
    3-Aminopropyltrimethoxysilane as an aminosilane coupling agent
    Hexamethyldisilazane as a hydrophobic silane coupling agent
  The compounded amounts of the aminosilane coupling agent and the hydrophobic silane coupling agent were set so that the molar fraction of the aminosilyl groups was 12%.
[Sample F2]
The other conditions except that the content of the inorganic filler was 0.5 parts by mass were equivalent to those in sample F1.
[Sample F3]
The other conditions except that the content of the inorganic filler was 1 part by mass were equivalent to those in sample F1. That is, the configuration was same as that for sample A4.
[Sample F4]
The other conditions except that the content of the inorganic filler was 5 parts by mass were equivalent to those in sample F1.
[Sample F5]
The other conditions except that the content of the inorganic filler was 10 parts by mass were equivalent to those in sample F1.
In samples F6 to F10, the other conditions except that the inorganic filler was surface-treated with only hexamethyldisilazane as the silane coupling agent were equivalent to those in samples F1 to F5, respectively. Sample F8 had the same configuration as that for sample A3.
(5-2) Results
With reference to the following Table 8, Table 9, and FIG. 3, the result of the evaluation of each sample in Experiment 5 will be described. In Table 8 and Table 9, the parenthesized item subsequent to "magnesium oxide" indicates a silane coupling agent used for the surface-treatment of the inorganic filler. FIG. 3 is a diagram showing the volume resistivity with respect to the content of the inorganic filler in Experiment 5. In FIG. 3, the horizontal axis represents the content of the inorganic filler, and the vertical axis represents the volume resistivity. In FIG. 3, the results from samples F1 to F5 are indicated as "aminosilane+HMDS", and the results from samples F6 to F10 are indicated as "HMDS".

TABLE 8

|  | Sample F1 | Sample F2 | Sample F3 | Sample F4 | Sample F5 |
|---|---|---|---|---|---|
| LDPE | 100 | 100 | 100 | 100 | 100 |
| Magnesium oxide (3-aminopropyl-trimethoxysilane + hexamethyl-disilazane) | 0.1 | 0.5 | 1 | 5 | 10 |
| Volume resistivity (@80° C.) (Ω · cm) | $5.1 \times 10^{16}$ | $5.5 \times 10^{17}$ | $6.4 \times 10^{18}$ | $3.5 \times 10^{18}$ | $3.3 \times 10^{18}$ |

TABLE 9

|  | Sample F6 | Sample F7 | Sample F8 | Sample F9 | Sample F10 |
|---|---|---|---|---|---|
| LDPE | 100 | 100 | 100 | 100 | 100 |
| Magnesium oxide (only hexamethyl-disilazane) | 0.1 | 0.5 | 1 | 5 | 10 |
| Volume resistivity (@80° C.) (Ω · cm) | $5.5 \times 10^{15}$ | $1.2 \times 10^{16}$ | $2.9 \times 10^{16}$ | $1.3 \times 10^{16}$ | $1.5 \times 10^{15}$ |

As shown in Table 9 and FIG. 3, when the inorganic filler was surface-treated with only the hydrophobic silane coupling agent, the volume resistivity was greatly increased, irrespective of the content of the inorganic filler, compared to the volume resistivity of each of sample A1 in which the inorganic filler was not added and sample A2 in which the inorganic filler was not surface-treated.

In addition, when the inorganic filler was surface-treated with only the hydrophobic silane coupling agent, the volume resistivity was increased with the increase in the content of the inorganic filler within the range of 0.1 parts by mass or more and 5 parts by mass or less of the content of the inorganic filler. However, when the content of the inorganic filler was more than 5 parts by mass, the volume resistivity tended to decrease gradually.

According to the results of samples F6 to F10, it was confirmed that when the inorganic filler is surface-treated with only the hydrophobic silane coupling agent, the decrease in the insulation property of the insulation layer 130 can be suppressed by setting the content of the inorganic filler to 5 parts by mass or less. However, even when the content of the inorganic filler is more than 5 parts by mass, it was confirmed that the volume resistivity can be higher than the volume resistivity of each of sample A1 in which the inorganic filler was not added and sample A2 in which the inorganic filler was not surface-treated.

In contrast, as shown in Table 8 and FIG. 3, when magnesium oxide was surface-treated with the hydrophobic silane coupling agent and the aminosilane coupling agent, the volume resistivity was greatly increased, irrespective of the content of the inorganic filler, compared to the volume resistivity of each of sample A1 in which the inorganic filler was not added and sample A2 in which the inorganic filler was not surface-treated.

In addition, when magnesium oxide was surface-treated with the hydrophobic silane coupling agent and the aminosilane coupling agent, the volume resistivity was increased with the increase in the content of the inorganic filler within the range of 0.1 parts by mass or more and 10 parts by mass or less of the content of the inorganic filler. In other words, even when the content of the inorganic filler was more than 5 parts by mass, the decrease in the volume resistivity was suppressed.

According to the results of samples F1 to F5, it was confirmed that since the inorganic filler is surface-treated with the hydrophobic silane coupling agent and the aminosilane coupling agent, the insulation property can be kept high even when the content of the inorganic filler in the resin composition is more than 5 parts by mass.

<Preferred Aspect of the Present Disclosure>

Hereinafter, supplementary descriptions of the preferred aspects of the present disclosure will be given.

(Supplementary Description 1)

A resin composition forming an insulation layer, including:

a base resin containing polyolefin, and an inorganic filler;

wherein a surface of the inorganic filler includes:

a hydrophobic silyl group represented by the following formula (1), and an aminosilyl group having an amino group:

[Chem. 11]

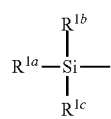

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

(Supplementary Description 2)

The resin composition according to supplementary description 1, wherein a molar fraction of the aminosilyl groups with respect to all of the silyl groups bonded to the surface of the inorganic filler is 2% or more and 90% or less.

(Supplementary Description 3)

The resin composition according to supplementary description 1, wherein a mass ratio of nitrogen to carbon is 0.7% or more and 35% or less, as obtained by elemental analysis of the surface of the inorganic filler by gas chromatography using a thermal conductivity detector under condition at a reaction temperature of 850° C. and a reduction temperature of 600° C.

(Supplementary Description 4)

The resin composition according to any one of supplementary descriptions 1 to 3, wherein the aminosilyl group includes a hydrocarbon group having the amino group; and the carbon number of each of $R^{1a}$, $R^{1b}$, and $R^{1c}$ included in the hydrophobic silyl group is smaller than the carbon number of the hydrocarbon group having the amino group in the aminosilyl group.

(Supplementary Description 5)

The resin composition according to supplementary description 4, wherein the carbon number of the hydrocarbon group having the amino group in the aminosilyl group is 3 or more and 12 or less.

(Supplementary Description 6)

The resin composition according to any one of supplementary descriptions 1 to 5, wherein the hydrophobic silyl group is bonded to a part of the surface of the inorganic filler, while the aminosilyl group is bonded to another part of the surface.

(Supplementary Description 7)

The resin composition according to any one of supplementary descriptions 1 to 6, wherein the content of the inorganic filler is 0.1 parts by mass or more and 10 parts by mass or less with respect to 100 parts by mass of the base resin.

(Supplementary Description 8)

The resin composition according to any one of supplementary descriptions 1 to 7, wherein the polyolefin constituting the base resin is at least any one of polyethylene, polypropylene, ethylene-α-olefin copolymer, and thermoplastic olefinic elastomer including ethylene propylene rubber or ethylene propylene diene rubber dispersed in or copolymerized with polyethylene or polypropylene.

(Supplementary Description 9)

The resin composition according to any one of supplementary descriptions 1 to 8, wherein the inorganic filler includes at least any one of magnesium oxide, silicon dioxide, zinc oxide, aluminum oxide, titanium oxide, zirconium oxide, carbon black, and a mixture of two or more of them.

(Supplementary Description 10)

The resin composition according to any one of supplementary descriptions 1 to 9, wherein the inorganic filler is surface-treated with silazane as the hydrophobic silane coupling agent.

(Supplementary Description 11)

The resin composition according to any one of supplementary descriptions 1 to 10, wherein mean volume diameter of the inorganic filler is 1 µm or less.

(Supplementary Description 12)

The resin composition according to any one of supplementary descriptions 1 to 11, wherein the base resin contains low density polyethylene, and a volume resistivity of a sheet of a resin composition is $8 \times 10^{15}$ Ω·cm or more, as measured under the condition at the temperature of 80° C. and the direct-current field of 50 kV/mm, when the sheet of the resin composition including the base resin and the inorganic filler and having a thickness of 0.2 mm is formed.

(Supplementary Description 13)

The resin composition according to any one of supplementary descriptions 1 to 11, wherein the base resin contains the thermoplastic olefinic elastomer including ethylene propylene rubber or ethylene propylene diene rubber dispersed in or copolymerized with polyethylene or polypropylene, and a volume resistivity of a sheet of a resin composition is $5\times10^{15}$ Ω·cm or more, as measured under the condition at the temperature of 80° C. and the direct-current field of 50 kV/mm, when the sheet of the resin composition including the base resin and the inorganic filler and having a thickness of 0.2 mm is formed.

(Supplementary Description 14)

An inorganic filler compounded into a resin composition forming an insulation layer and added to a base resin containing polyolefin, wherein a surface of the inorganic filler includes:
a hydrophobic silyl group represented by the following formula (1), and
an aminosilyl group having an amino group:

[Chem. 12]

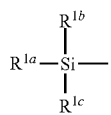
(1)

wherein $R^{1c}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

(Supplementary Description 15)

A direct-current power cable including:
a conductor, and
an insulation layer provided to cover an outer periphery of the conductor;
the insulation layer containing a resin composition including:
a base resin containing polyolefin, and
an inorganic filler;
wherein a surface of the inorganic filler includes:
a hydrophobic silyl group represented by the following formula (1), and
an aminosilyl group having an amino group:

[Chem. 13]

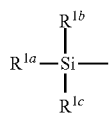
(1)

wherein $R^1$, $R^{1b}$, and $R^{1c}$ represent any one of a C1 to $C_{24}$ alkyl group, a $C_2$ to $C_{20}$ alkenyl group, or a $C_6$ to $C_{12}$ aryl group optionally substituted with a C to C3 alkyl group, provided that $R^{1a}$, $R^{1b}$, and $R^{1c}$ may be the same, or two or more of them may be different.

(Supplementary Description 16)

A method of manufacturing a direct-current power cable, including:
preparing a resin composition including a base resin containing polyolefin, and an inorganic filler; and
forming an insulation layer with the resin composition to cover an outer periphery of a conductor, the preparation of the resin composition including: surface-treating the inorganic filler with a predetermined hydrophobic silane coupling agent and a predetermined aminosilane coupling agent;

wherein, in the surface-treatment of the inorganic filler,
a hydrophobic silyl group derived from the hydrophobic silane coupling agent and represented by the following formula (1), and an aminosilyl group derived from the aminosilane coupling agent and having an amino group are bonded to a surface of the inorganic filler:

[Chem. 14]

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{1a}$, $R^{1b}$, and $R^{1c}$ may be the same, or two or more of them may be different.

10 direct-current Power cable
110 Conductor
120 Internal semiconductive layer
130 Insulation layer
140 External semiconductive layer
150 Shielding layer
160 Sheath

What is claimed is:

1. A resin composition forming an insulation layer, comprising:
a base resin containing polyolefin, and
an inorganic filler;
wherein a surface of the inorganic filler comprises:
a hydrophobic silyl group represented by the following formula (1), and
an aminosilyl group having an amino group,
wherein a molar fraction of the aminosilyl groups with respect to all of the silyl groups bonded to the surface of the inorganic filler is 2% or more and 90% or less:

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group,
provided that $R^{1a}$, $R^{1b}$, and $R^{1c}$ may be the same, or two or more of them may be different.

2. The resin composition according to claim 1,
wherein the aminosilyl group includes a hydrocarbon group having the amino group; and
the carbon number of each of $R^{1a}$, $R^{1b}$, and $R^{1c}$ included in the hydrophobic silyl group is smaller than the carbon number of the hydrocarbon group having the amino group in the aminosilyl group.

3. The resin composition according to claim 2,
wherein the carbon number of the hydrocarbon group having the amino group in the aminosilyl group is 3 or more and 12 or less.

4. The resin composition according to claim 1,
wherein the hydrophobic silyl group is bonded to a part of the surface of the inorganic filler, while the aminosilyl group is bonded to another part of the surface.

5. The resin composition according to claim 1,
wherein the content of the inorganic filler is 0.1 parts by mass or more and 10 parts by mass or less with respect to 100 parts by mass of the base resin.

6. The resin composition according to claim 1,
wherein the base resin contains low density polyethylene, and
a volume resistivity of a sheet of a resin composition is $8 \times 10^{15}$ Ω·cm or more, as measured under the condition at the temperature of 80° C. and the direct-current field of 50 kV/mm, when the sheet of the resin composition comprising the base resin and the inorganic filler and having a thickness of 0.2 mm is formed.

7. The resin composition according to claim 1,
wherein the base resin contains a thermoplastic olefinic elastomer comprising ethylene propylene rubber or ethylene propylene diene rubber dispersed in or copolymerized with polyethylene or polypropylene, and
a volume resistivity of a sheet of a resin composition is $5 \times 10^{15}$ Ω·cm or more, as measured under the condition at the temperature of 80° C. and the direct-current field of 50 kV/mm, when the sheet of the resin composition comprising the base resin and the inorganic filler and having a thickness of 0.2 mm is formed.

8. A direct-current power cable comprising:
a conductor, and
an insulation layer provided to cover an outer periphery of the conductor;
the insulation layer containing a resin composition according to claim 1

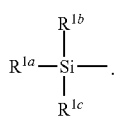

(1)

9. A method of manufacturing a direct-current power cable, comprising:
preparing a resin composition according to claim 1; and
forming an insulation layer with the resin composition to cover an outer periphery of a conductor

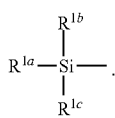

(1)

10. A resin composition forming an insulation layer, comprising:
a base resin containing polyolefin, and
an inorganic filler;
wherein a surface of the inorganic filler comprises:
a hydrophobic silyl group represented by the following formula (1), and
an aminosilyl group having an amino group,
wherein a mass ratio of nitrogen to carbon is 0.7% or more and 35% or less, as obtained by elemental analysis of the surface of the inorganic filler by gas chromatography using a thermal conductivity detector under condition at a reaction temperature of 850° C. and a reduction temperature of 60° C.:

(1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group,
provided that $R^{1a}$, $R^{1b}$, and $R^{1c}$ may be the same, or two or more of them may be different.

11. The resin composition according to claim 10,
wherein the aminosilyl group includes a hydrocarbon group having the amino group; and
the carbon number of each of $R^{1a}$, $R^{1b}$, and $R^{1c}$ included in the hydrophobic silyl group is smaller than the carbon number of the hydrocarbon group having the amino group in the aminosilyl group.

12. The resin composition according to claim 11,
wherein the carbon number of the hydrocarbon group having the amino group in the aminosilyl group is 3 or more and 12 or less.

13. The resin composition according to claim 10,
wherein the hydrophobic silyl group is bonded to a part of the surface of the inorganic filler, while the aminosilyl group is bonded to another part of the surface.

14. The resin composition according to claim 10,
wherein the content of the inorganic filler is 0.1 parts by mass or more and 10 parts by mass or less with respect to 100 parts by mass of the base resin.

15. The resin composition according to claim 10,
wherein the base resin contains low density polyethylene, and
a volume resistivity of a sheet of a resin composition is $8 \times 10^{15}$ Ω·cm or more, as measured under the condition at the temperature of 80° C. and the direct-current field of 50 kV/mm, when the sheet of the resin composition comprising the base resin and the inorganic filler and having a thickness of 0.2 mm is formed.

16. The resin composition according to claim 10,
wherein the base resin contains a thermoplastic olefinic elastomer comprising ethylene propylene rubber or ethylene propylene diene rubber dispersed in or copolymerized with polyethylene or polypropylene, and
a volume resistivity of a sheet of a resin composition is $5 \times 10^{15}$ Ω·cm or more, as measured under the condition at the temperature of 80° C. and the direct-current field of 50 kV/mm, when the sheet of the resin composition comprising the base resin and the inorganic filler and having a thickness of 0.2 mm is formed.

17. A direct-current power cable comprising:
a conductor, and
an insulation layer provided to cover an outer periphery of the conductor;
the insulation layer containing a resin composition according to claim 10.

18. A method of manufacturing a direct-current power cable, comprising:
preparing a resin composition according to claim 10; and
forming an insulation layer with the resin composition to cover an outer periphery of a conductor.

19. An inorganic filler,
wherein a surface of the inorganic filler comprises:
a hydrophobic silyl group represented by the following formula (1), and
an aminosilyl group having an amino group,
wherein a molar fraction of the aminosilyl groups with respect to all of the silyl groups bonded to the surface of the inorganic filler is 2% or more and 90% or less:

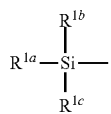  (1)

wherein $R^{1a}$, $R^{1b}$, and $R^c$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group,
provided that $R^{1a}$, $R^{1b}$, and $R^{1c}$ may be the same, or two or more of them may be different.

20. An inorganic filler,
wherein a surface of the inorganic filler comprises:
a hydrophobic silyl group represented by the following formula (1), and
an aminosilyl group having an amino group,
wherein a mass ratio of nitrogen to carbon is 0.7% or more and 35% or less, as obtained by elemental analysis of the surface of the inorganic filler by gas chromatography using a thermal conductivity detector under condition at a reaction temperature of 850° C. and a reduction temperature of 600° C.:

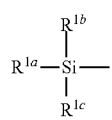  (1)

wherein $R^{1a}$, $R^{1b}$, and $R^{1c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group,
provided that $R^{1a}$, $R^{1b}$, and $R^{1c}$ may be the same, or two or more of them may be different.

* * * * *